Figure 1:
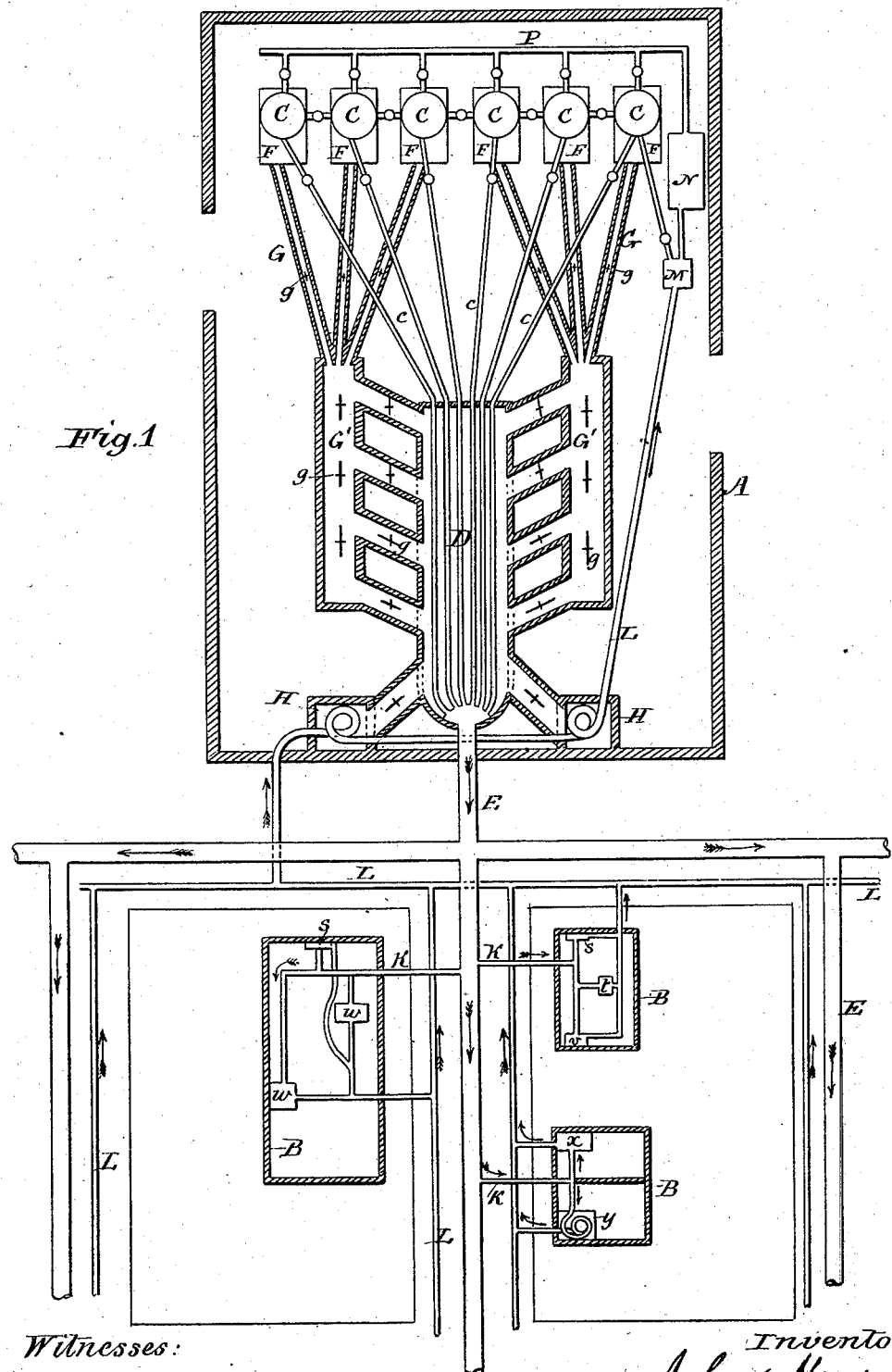

(No Model.) 2 Sheets—Sheet 1.

J. NEWTON.
System for Distributing Heat and Power in Cities.

No. 241,404. Patented May 10, 1881.

Witnesses:
E. E. Masson,
C. J. Hedrick

Inventor:
John Newton
by A Pollok
his attorney

N. PETERS, Photo-Lithographer, Washington, D. C.

(No Model.) 2 Sheets—Sheet 2.

J. NEWTON.
System for Distributing Heat and Power in Cities.
No. 241,404. Patented May 10, 1881.

Witnesses:
E. E. Masson
C. J. Hedrick

Inventor:
John Newton
by A. Pollok
his attorney.

UNITED STATES PATENT OFFICE.

JOHN NEWTON, OF BROOKLYN, NEW YORK.

SYSTEM FOR DISTRIBUTING HEAT AND POWER IN CITIES.

SPECIFICATION forming part of Letters Patent No. 241,404, dated May 10, 1881.

Application filed March 31, 1881. (No model.)

*To all whom it may concern:*

Be it known that I, JOHN NEWTON, of Brooklyn, in the county of Kings and State of New York, have invented a new and useful Improvement in Systems for Distributing Heat and Power in Cities, which invention is fully set forth in the following specification.

This invention has for its object to supply heat and power from a central source to public and other buildings by generating and distributing through mains and pipes a suitable agent and conveying it to interior apparatus in said buildings, such as engines, radiators, ranges, and the like, for producing motive power, and heat for warming, cooking, drying, or other purpose.

Careful consideration of methods already in use or recommended for use to furnish power and heat in this way to buildings at distances from the generators will clearly reveal their incompleteness and insufficiency for the objects proposed to be accomplished, and will also show that they are attended with a considerable waste of heat in their application.

One method in use consists in conducting saturated steam fresh from the boilers, without additional preparation, through pipes or mains to the places to be supplied with power and heat. In steam thus generated in boilers over water the relation between the temperature, pressure, and density is fixed, so that the same density and pressure always correspond to the same temperature, and such steam (known as "saturated steam") exists both at the condensing and at the generating point, condensation taking place if the temperature be allowed to fall, and more water being evaporated and more steam generated if the temperature be raised.

Steam of a higher temperature is necessary for some of the purposes named than for others. For warming buildings any temperature which will heat the air of the space to 70° Fahrenheit and maintain that degree of heat will suffice, so that steam from 212° upward is capable of producing the desired effect. For the purposes of power the pressure of the steam may vary, as a general rule, from seventy pounds on the square inch to about one hundred pounds, and the steam must therefore have a corresponding temperature of, say, 303° to 328°, or thereabout. For the purposes of cooking in all the varieties in common use, and to perform these operations to perfection and with dispatch, a range of temperatures from that of boiling water to a degree as high as between 400° and 450° Fahrenheit is required. For purposes of illustration, let a temperature of 430° be assumed as sufficient for all the varieties of cooking in common use. Saturated steam at this temperature has a pressure of about three hundred and fifty pounds on the square inch, and it is not to be supposed, when the risk of life and property from such enormous pressure is considered, that a system involving boilers to generate such steam, mains to conduct it in the large quantities necessary for the supply of populous neighborhoods, and interior apparatus in houses, ranges, radiators, air-heaters, &c., to withstand it would be tolerated by the public authorities, or considered to be practicable and desirable by the proprietors themselves. Steam of pressures equal to and even exceeding the high pressure aforesaid may have been used for power, but only in small quantities, and with special precautions as to the strength of the materials of the boilers and apparatus, not applicable to a system for supplying the steam in the large quantities required to furnish heat for cooking in populous neighborhoods. Saturated steam, therefore, considered merely as a source of heat and pressure, and omitting for the present reference to other grave defects, may be used to furnish motive power and heat for warming buildings and for limited varieties of cooking; but other varieties of cooking in common use either could not be performed at all or only with considerable delay and imperfection if only safe and moderate pressure be tolerated. On the other hand, a pressure of the steam corresponding with a temperature proper for cooking is coupled with an imminent danger to person and property, and with great additional cost, arising from the unusual strength necessary for the generators and whole apparatus, including the mains and interior apparatus in the rooms.

A very serious defect of another kind attaches to the use of saturated steam. However well guarded the whole apparatus, including the mains, may be against the loss of heat from radiation, conduction, and other causes, a fall of temperature begins as soon as the steam leaves the boilers, and continues at a progressive rate to the end of the mains, and condensation throughout the whole distance traversed ensues, and causes a deposition of water in the pipes and mains, and especially in depressions. The presence of water so formed increases the rate of the condensation itself, and the steam passing over the water of condensation is furnished to the customers wet, and with lower temperature and pressure. Contrivances have been used to free the mains and other parts from water; but these will not effect the delivery of the steam dry and unimpaired in temperature and pressure, because from the nature of saturated steam condensation throughout the system and the deposition of water must be continual. The mains must be freed from water, lest they should be choked at the depressions, although this operation will not restore the quality of the steam; and steam of higher pressure than is needed for power must be generated in the boilers to compensate for the loss of pressure, and after all the cost and trouble of these operations the steam will be furnished to the consumer in an impaired condition for heating, cooking, and especially for power.

The operators of the scheme for supplying saturated steam, even if they should assume the extraordinary risk of generating and conveying to distances steam for cooking purposes of the temperature of 430° and pressure of about three hundred and fifty pounds, would necessarily use boilers and mains other than those employed for steam of lower temperature and pressure, and applied merely to purposes of power and warmth, unless they should recklessly incur additional risk by multiplying the quantity of steam of the highest pressure and applying it to furnishing power and warmth, as well as to cooking purposes. Two sets of mains and of other apparatus would therefore be necessary in such a system, one for steam of high pressure and the other for steam of low pressure.

A second mode of supplying power and heat at distances from the generating-point, as stated by its projectors, is by means of water heated in boilers under pressure and conveyed thence in mains. The use of water at high temperature and corresponding pressure for furnishing heat for cooking would involve risks even more serious than those enumerated for saturated steam of the same temperature and pressure, because any sudden relaxation of pressure which might arise from accident to the apparatus in any part, or from carelessness in manipulation, would permit a portion of the water to develop with a bound into steam, and this would act like an explosive compound, giving off explosions in such rapid succession as to constitute one long continuous explosion, spreading over a considerable length of the mains and other apparatus, and therefore more destructive to the apparatus and surrounding objects than the bursting produced by the overstrain of a constant pressure from steam.

Hot water, when applied to purposes of power, is first converted into steam by simply relieving the pressure. A small portion only is developed into steam of adequate pressure, leaving a large surplus of water to be sent back to the generators to be reheated. Considering the application of hot water to the three purposes of power, cooking, and warming, and comparing it pound for pound with steam of the same temperature and pressure, it will be found that one pound of steam will perform the average function of about four pounds of water, so that in the case of water a large excess of transportation must be provided, involving additional consumption of coal. It is therefore evident that heated water for the purposes named would be more dangerous and less economical then steam.

In the present invention the difficulties mentioned are overcome.

Instead of saturated steam taken directly from the boilers, or water heated in boilers under pressure, superheated steam of high temperature and relatively low pressure is employed. The steam generated in the boilers is first superheated so as to have the desired temperature and pressure, and then conveyed in underground mains and pipes to the required distances from the generators, to be supplied to the interior apparatus in condition suitable for working engines and other machinery, and for supplying heat of the degrees needed for cooking with perfection and dispatch, for warming buildings, and for other purposes. The steam is generated at the pressure of one hundred pounds and temperature of about 328° Fahrenheit, or other moderate pressure and corresponding temperature, and superheated without material increase in pressure to between 400° and 450°, or thereabout. The steam is allowed to expand during the superheating operation, and the pressure therefore does not increase with the temperature, or at least not in the same degree. The temperature should not be so high that the steam, when supplied to engines, will injuriously affect the pistons and other parts with which it comes in contact. The degree of temperature can be varied from that mentioned as may be judged expedient for the locality and under the circumstances of the case.

It is generally preferred to superheat the steam without change in pressure; but this is not essential. The steam, if desired, can, in superheating, be raised also in pressure and allowed to expand into the mains, or the pressure can be reduced in the superheating-chamber, and in either case steam of the required low pressure and high temperature can be obtained.

In the improved system no condensation can take place in the apparatus or in the mains until, by radiation and conduction of heat away from the steam, the temperature has been reduced to the temperature of saturation, or about that of the steam in the boilers, and whenever, owing to the length of line or other circumstances, the steam is liable to fall below the proper degree, it is reheated by passing through auxiliary superheaters placed at determined points along the route of the distributing-mains. These auxiliary superheaters are not interpolated with the object of restoring the steam in the mains to the superheated state, for the steam is never to be allowed to fall out of that condition, but only to restore heat sufficient to keep the steam highly efficient, especially in respect to its cooking qualities. It may sometimes be inexpedient, especially when the course of the main is long, to superheat the steam at the start to such extent as to retain heat throughout the course sufficient for cooking in perfection, because the temperature in the beginning might thereby be made inconvenient for domestic purposes and injurious to engines. This objection is avoided by the use of superheaters along the route; but these will not ordinarily be necessary.

As the steam in this system, after leaving the boilers, is always kept in a superheated state, there will be no condensation in the mains and supplying apparatus, and the system will in operation be relieved of the cost and injurious consequences contingent upon condensation in the mains which necessarily attend the use of saturated steam for the purposes named.

As the steam, superheated as explained, will suffice perfectly for all the purposes of power, cooking, warmth, &c., one set only of boilers, mains, and apparatus will be necessary.

The weight of metal in the boilers, mains, and other apparatus may be much less than that required in the same parts to sustain the pressure due to saturated steam or heated water at the temperature proper for the various kinds of cooking.

The pressure of the steam from the generators and superheaters will be generally sufficient to keep up a free circulation from the boilers through the superheaters, mains, and distributing-pipes and apparatus in the buildings to be supplied, and also through any additional superheaters that may be placed along the route; but, if desired, forcing-pumps can be employed at various points for the purpose of assisting the circulation. After passing through the apparatus in the building supplied, whether these be ranges, radiators, or engines, one or all, the steam can be allowed to escape into the atmosphere; but it is preferred to return it to the generators by suitable return-pipes. It will return partly, perhaps, as steam and partly as water of condensation. Force or suction pumps, or both, can be used, or other appropriate appliances can be employed, to insure circulation through the return-pipes.

As a greater supply of steam will be required during one season than another, and at certain hours of the day than others, the velocities impressed upon the steam would be different at different times during its passage through the superheaters, and consequently the periods of time during which the steam would be subjected to heat in the superheaters would accordingly be longer or shorter. To compensate for this difference, and to insure such degree of superheating at any time as may be necessary, regulating and controlling devices are employed, so that when the steam passes slowly through the superheater the length and surface of the superheated portion thereof can be diminished, and when the steam passes through the superheater more quickly the length and area of the superheated portion can be increased.

The superheating of the steam can be effected by means of the products of combustion from the boiler-furnaces, and the temperature and pressure of the superheated steam can be regulated by suitable cocks and dampers in the steam-pipes and flues, respectively.

In the transportation of the steam loss of heat from radiation, conduction, and other causes will take place from its leaving the superheaters to its delivery at the points where it is to be used, and to provide as far as possible against such loss the mains and other necessary parts are jacketed with some non-conductor or imperfect conductor of heat, such as heretofore used for jacketing steam-pipes, and inclosed in a box or wrapper rendered water-tight, or nearly so, by some of the well-known substances suitable for such purpose; or the mains and other parts laid under ground are inclosed in a water-tight box made of suitable material which is a non-conductor or imperfect conductor, so as to be surrounded by confined air, or the space about the mains can be filled with a packing of non-conducting or imperfectly-conducting material. A box of wood, brick, concrete, or other imperfect conductor, plastered within and without, could be used.

Transverse partitions are employed to support the mains or pipes in their boxes, and to prevent circulation within the latter. A small pipe with automatic valve is connected with the interior of the box, to let off air and vapor and prevent injurious pressure upon the box.

By these contrivances the continual percolation of water is prevented, and the consequent loss of heat in vaporizing the water. The return-pipes can also be jacketed, and they can also be inclosed in the same boxes with the distributing mains and pipes.

To allow for the changes in length of the mains and other pipes due to changes of temperature, any well-known and suitable expansion-joint or other proper contrivance can be used.

By this system, therefore, a high degree of heat with moderate pressure of steam may be provided, and the great advantages of superheated steam in working engines, heating buildings, and in culinary processes secured. Instead of wet steam being introduced into the cylinders of engines, there is superheated steam capable of greater expansion without fear of condensation. For warming and cooking there is steam which does not fill the supply-pipes in the house with condensations, and which possesses greater heat. The mains are not clogged with condensations, impairing the efficiency of the passing steam by lowering its temperature and pressure, and charging it with vapor.

The accompanying drawings, which form a part of this specification, illustrate the manner in which the invention may be carried into effect.

Figure 2:
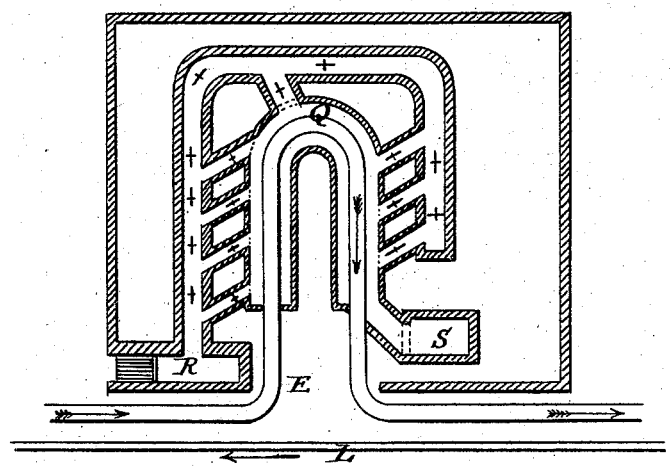
Figure 3:
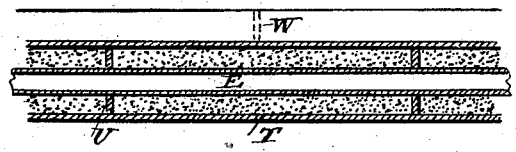

Figure 1 is a diagram illustrating the apparatus at the central station, together with interior apparatus at a few houses in the neighborhood, and the main and pipes for supplying the superheated steam thereto; and Fig. 2 a similar diagram of an auxiliary superheater. Fig. 3 is a longitudinal section of a portion of a boxed distributing-main, and Fig. 4 a cross-section.

Referring to Fig. 1, A represents the walls inclosing the plant at the central station, and B those of buildings to be supplied with heat and power. A series of boilers, C, are connected by steam-pipes c, extending through the superheater D, with the distributing-main E. The furnaces F of the boilers are connected by flues G G' with the chamber of the superheater inclosing the steam-pipe c. The chimneys H are connected with this chamber by flues. The flues are all provided with dampers g, so that by opening or closing the dampers the steam-pipes may be more or less exposed to the hot gases or products of combustion from the boiler-furnaces. The furnaces and boilers are of ordinary or suitable construction, and are provided with the usual gages, draft-regulators, indicators, &c., and the steam-pipes c have cocks to regulate the flow of steam through the superheater into the main.

The buildings B are supplied with steam from the mains through the distributing-pipes K, which deliver it to the interior apparatus, radiators s, air-heater t, ranges v, engines w, driers x, boilers y, or other suitable apparatus.

A return-pipe, L, is shown connected with the exhaust-pipes of the interior apparatus, and also with a steam-pump, M, which pumps the water of condensation and steam into the reservoir N, to be supplied through the feed-pipe P to the boilers. The arrows indicate the direction which the steam takes through the mains and pipes.

In Fig. 2 the main E is carried through the auxiliary superheater Q, where its temperature is raised by the products of combustion from the furnace R. Suitable flues and dampers are provided for regulating the flow of the products of combustion through the superheating-chamber to the chimney S.

Figure 4:
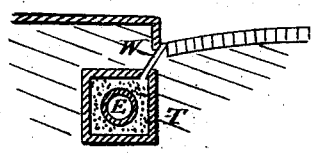

In Figs. 3 and 4 the main E is shown sustained in the box T, of suitable water-proof material, by the partitions U. An escape-pipe, W, which should be of small bore and have a valve to prevent inflow of water, extends from the interior of the box into the open air, so as to relieve internal pressure due to the expansion of air or generation of steam within the box.

The main can be surrounded with non-conducting material, or the space left vacant, if desired.

It is obvious that pressure-gages, thermometers, and other similar apparatus can be employed to ascertain the condition of the steam in the mains and pipes.

Boxed mains, such as shown in Figs. 3 and 4, are deemed to be best suited for use in the improved heat and power distributing system, and their construction is therefore described and illustrated; but the invention is not limited to them, nor are they specifically claimed herein, being reserved for a separate application.

Having thus fully described the said invention and the manner of carrying the same into effect, what I claim is—

1. The method of supplying heat and power from a central source to public and other buildings by generating and distributing through mains and pipes superheated steam of high temperature and relatively low pressure, and conveying such steam into said buildings to suitable interior apparatus for producing motive power, and for warming, cooking, drying, or other purpose, substantially as described, whereby excess of pressure in the main and pipes and connected apparatus is avoided and the steam is prevented from condensing, and can be supplied to the said interior apparatus under conditions suitable for the desired purpose, as set forth.

2. An organized system for supplying heat and power from a central source by means of superheated steam of low pressure and high temperature, comprising boilers for generating steam and superheaters for raising the temperature of the steam while permitting it to expand, in combination with the underground distributing mains and pipes and the interior apparatus for producing motive power and heat for various purposes, such as ranges, radiators, and engines, as set forth.

3. The combination, with underground distributing mains and pipes, of steam-generators, superheaters for raising the temperature of said steam after it leaves the generators, and means, as indicated, for regulating the temperature and pressure of the superheated steam and controlling the supply to said mains and pipes, substantially as described.

4. The combination, with distributing mains and pipes of steam-generators and superheaters for supplying steam of high temperature and low pressure to said mains and pipes, of auxiliary heaters located at suitable points along the route of said mains or pipes, for maintaining the temperature of the steam, substantially as described.

5. The combination, with distributing mains and pipes, of one or more boilers and furnaces, one or more superheaters connected with said boilers, flues connected with the fire-chambers of said furnaces and arranged to carry the products of combustion over said superheaters, and dampers for cutting off or admitting the said products of combustion, more or less, as required, substantially as described.

6. The combination, with underground distributing mains and pipes and boilers, and superheaters for supplying superheated steam of low pressure and high temperature to said mains and pipes, to be conveyed to interior apparatus for utilizing the steam, of return-pipes for returning the steam or water of condensation, so that it can be reused, substantially as described.

In testimony whereof I have signed this specification in the presence of two subscribing witnesses.

JOHN NEWTON.

Witnesses:
 JOHN McCLURE,
 A. POLLOK.